United States Patent Office 2,734,069
Patented Feb. 7, 1956

2,734,069

BACILLUS DISSOLVING COMPOUND AND METHOD FOR PRODUCING SAME

Sakae Masuda, Edogawa-ku, Tokyo, Japan

No Drawing. Application September 13, 1952, Serial No. 309,568

2 Claims. (Cl. 260—456)

The present invention relates to a bacillus dissolving composition and to a method for producing same.

Heretofore, there have been known numerous bacillicides, but all of them are capable only of destroying bacillus, but are not able to dissolve bacillus, especially acid-resisting bacillus. Furthermore, it has been known that some bacillicides are entirely inert to a certain tamed bacilli. Consequently, even though a person may have recovered from his illness, nevertheless there is a fear of return of the disease. The object of the present invention is therefore to discover a way in which a bacillus dissolving composition can be produced.

In order to solve this problem, I have studied and found a method by which a novel composition which can literally dissolve bacillus is produced.

The object of the invention is therefore to obtain a composition which has heretofore been unknown and which is able to dissolve bacillus substantially.

According to the present invention the novel bacillus dissolving composition is obtained by reacting a mixture of alcohol and xylol with sulphonic derivatives of salicylic acid.

In the practice of the present invention, alcohol and xylol are mixed in equivalent quantities and the mixture is reacted with sulpho salicylic acid, the latter being obtained by mixing sulphuric acid with salicylic acid in a ratio of 1 part of the former to 10 parts of the latter. For the purpose of attaining the reaction, the mixture of alcohol and xylol is mixed with an equivalent quantity of sulpho-salicylic acid, and the whole is thoroughly shaken to complete reaction. Thereafter, the supernatant layer is separated out and discarded, and the lower layer is taken out and subjected to distillation to remove completely the remaining alcohol, and subsequently thickened, and the thickened liquid is, after cooling, filtered and then diluted with distilled water to obtain the bacillus dissolving composition in a liquid state. This liquid composition is an entirely novel bacillus dissolving composition.

The bacillus dissolving composition obtained by the present invention is presumed to be a molecular compound constructed of the three substances represented by the following formulae (1), (2) and (3).

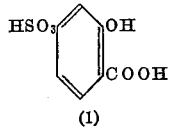
(1)

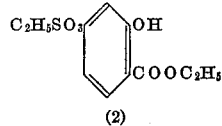
(2)

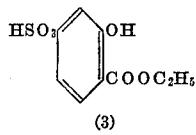
(3)

In other words, the bacillus dissolving composition according to the present invention is presumed to be a molecular compound possessing a structure which is composed of these three substances which are in a certain definite ratio.

The following is one example of carrying out the present invention into practice:

200 cc. alcohol and 200 cc. xylol are mixed, giving 400 cc. of the mixture. Separately, 400 cc. of 20% solution of sulpho-salicylic acid are obtained by mixing 1 part of concentrated sulphuric acid and 10 parts of salicylic acid, and added to the mixture above referred to, and the whole is thoroughly shaken, and thereafter let stand, to form an upper and a lower layer. The upper layer consisting solely of xylol is drawn off, and the lower layer is subjected to distillation to distill off completely the remaining alcohol, and thereafter thickened to 100 cc. by heating, and then diluted with 700 cc. distilled water, thereby giving the desired liquid bacillus dissolving composition aimed at. A drop of same is taken and blended with a quantity of a bacillus floating liquid made separately, and the blend is brought to dryness and colored, and observed under microscope, proving that the bacillus has been completely dissolved.

The liquid composition obtained as above described is strongly acidic, and has an outer appearance of being somewhat golden color, and further has a characteristic feature of being heat-resisting.

The liquid composition, when further thickened by heating, and then cooled, gives rise to a powdered crystalline mass, with a low melting point, namely of about 20–40° C. The powdered mass and the liquid compound are both very stable and do not deteriorate even after a prolonged preservation.

The following experiments demonstrate the activity of the bacillus dissolving composition according to the present invention.

*Experiment 1.*—To 2 cc. of the liquid compound obtained by the above example there is added a quantity of live *Bacillus tuberculosis* corresponding to two platinum wire ears. As a contrast, to 2 cc. of distilled water there is added a corresponding quantity of live tuberculosis bacillus. A drop of each the liquid compound and the distilled water is taken and observed under a microscope after tuberculosis coloration, with the result that the bacillus in the distilled water has been completely colored, while the bacillus in the liquid compound has been dissolved to a trace, of which merely a shadowy spot has been observed.

When both are cultured, in the case of the distilled water, propagation of bacillus is found after a month of culture, while in case of the liquid composition not any propagation of bacillus is found even after 40 days of culture. Further, in the latter case, no growth of bacillus is seen after 12 hours, 24 hours and 48 hours after mixing with live bacillus, thereby giving evidence that complete sterilization of bacillus can be brought about.

*Experiment 2.*—To 2 cc. of distilled water and 2 cc. of the liquid compound above referred to, there has been added each a quantity of bacillus Salmonella corresponding to two platinum wire ears, and a drop of each is taken and subjected to methylene blue coloration for microscopic observation, with the result that in the case of the liquid composition no bacillus can be observed, while in the case of the distilled water the bacillus is colored typically.

When both are cultured, growth of bacillus is observed in the case of the distilled water, while in the case of the liquid composition not any growth of bacillus is observed even after 24 hours of culture.

I claim:

1. A method of producing a bacillus dissolving composition which comprises mixing ethyl alcohol and xylol in equal amounts, adding to the mixture thus formed an equal amount of sulpho-salicylic acid, allowing the resultant mixture to stand until two layers are formed, separating the lower layer from the upper layer and subjecting the separated lower layer to distillation.

2. A bacillus dissolving composition produced by mixing ethyl alcohol and xylol in equal amounts, adding to the mixture thus formed an equal amount of sulphosalicylic acid, allowing the resultant mixture to stand until two layers are formed, separating the lower layer from the upper layer and subjecting the separated lower layer to distillation.

References Cited in the file of this patent

UNITED STATES PATENTS

| | | |
|---|---|---|
| 2,359,291 | Gluesenkampf et al. | Oct. 3, 1944 |
| 2,527,880 | Harris | Oct. 31, 1950 |

OTHER REFERENCES

Beilstein, vol. XI, 2nd Supp. (p. 233).